Feb. 10, 1959   M. J. NEUMEYER   2,873,173
ENDOTHERMIC GAS GENERATOR
Filed April 8, 1955

INVENTOR.
Martin John Neumeyer
BY
George R. Clark
Atty.

United States Patent Office 2,873,173
Patented Feb. 10, 1959

2,873,173

ENDOTHERMIC GAS GENERATOR

Martin John Neumeyer, Addison, Ill., assignor to Sunbeam Corporation, Chicago, Ill., a corporation of Illinois Application April 8, 1955, Serial No. 500,113

2 Claims. (Cl. 23—281)

This invention relates generally to atmosphere or gas generators to be used in providing controlled gas atmospheres for furnaces, and more specifically it relates to apparatus for controlling the air-fuel ratio of the gases supplied to such generators. Endothermic gas generators are conventionally employed to produce gas atmospheres for heat treating furnaces. It has been found that this type of generator provides the most inexpensive means for producing a reasonably neutral mixture of gases which is very satisfactory for use in many heat treating applications.

When carburizing or carbonitriding is to be performed, the output gases of the endothermic gas generator form the major portion of the atmosphere present in the heat treating furnace. For effective control of the carburizing or carbonitriding processes, it is necessary that only small quantities of active gas be present in the furnace while the bulk of the atmosphere present be made up of neutral gases which are sometimes termed carrier gases. It is quite necessary, therefore, in the maintenance of effective process control that the quality of the carrier gas be maintained carefully. While the quality must be high, at the same time, cost must be minimized for this type of generator to compete with other methods of providing inert atmospheres. There are several undesirable conditions associated with poor product control of the endothermic gas generator. These conditions will be pointed out after a brief consideration of the process involved in inert gas generation.

Conventionally, an endothermic gas generator comprises a catalyst filled retort into which controlled quantities of air and a hydrocarbon gas or fuel-gas, as it is sometimes called, such as methane are introduced and means for heating the retort and catalyst bed to a temperature of between 1700° and 2000° F. The reaction which takes place in the retort is as follows:

$$2CH_4 + O_2 + 3.76N_2 \rightarrow 2CO + 3.76N_2 + 4H_2$$

From the above equation, it can be determined that an air to fuel-gas ratio of 2.38 is necessary for a complete reaction of the components. This ratio will hereinafter be referred to as simply the air-fuel ratio. It is well known that when an excess of gas is present in the endothermic gas generator, carbon will be formed in the catalyst bed. Such formation of carbon cuts down the rate of gas flow through the retort and eventually requires that the generator be shut down for removal of this carbon deposit. On the other hand, if excessive quantities of air are present in the input to the generator, the product of the generator will contain water and carbon dioxide. The presence of carbon dioxide and water substantially lowers the carburizing which can be achieved at a particular temperature. To attain high carbon steels at high temperatures, it is necessary to reduce the amounts of carbon dioxide and water in the gas atmosphere to less than .1 percent. In order that the impurities in the product be maintained at this minimum, the quantities of air and fuel should be controlled to a similar percentage.

This very close control of the air-fuel ratio is difficult, if not impossible, to accomplish with the conventional regulators and controls available. It has long been the goal in the gas generator field to find means to utilize inexpensive regulators and gauges to attain satisfactory control of the gas flow in an endothermic gas generator.

It is accordingly an object of this invention to provide an improved gas metering and mixing means for use on endothermic gas generators.

It is another object of this invention to provide a simplified flow controlled apparatus whereby a precise air-fuel ratio is maintained by the use of a single pressure regulator.

It is a further object of this invention to provide simplified apparatus for controlling the air-fuel ratio of an endothermic gas generator by means of the flow change created by the depositing of solid material in the generator.

Further objects and advantages of the present invention will become apparent as the following description proceeds, and the features of novelty which characterize the invention will be pointed out with particularity in the claims annexed to and forming a part of this application.

For a better understanding of the present invention, reference may be had to the accompanying drawings in which.

The present invention employs, as a means for controlling the air-fuel ratio of the components supplied to the generator, the change in the quantity of solid material contained in the generator retort and thereby obstructing the flow of gases. When the air-fuel ratio becomes unbalanced or lowered from the desired optimum condition so that there is an excessive amount of gas present in the generator, there will be a depositing of carbon in the catalyst material of the generator. By utilizing the change in flow caused by this carbon deposit, it is possible to rebalance the reaction and increase the air-fuel ratio to a point where carbon is no longer deposited.

Figure 1:
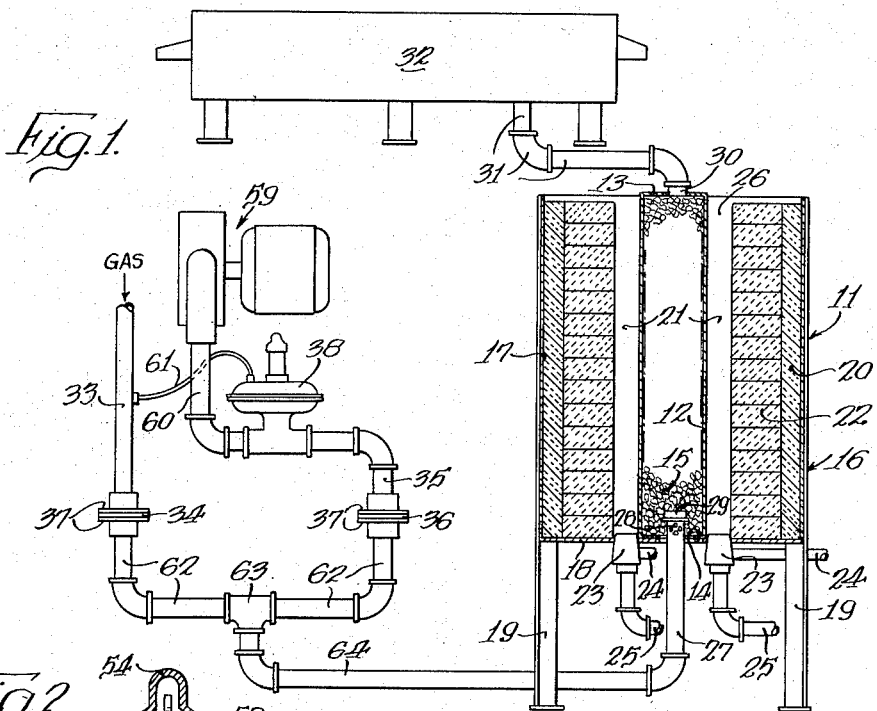
Fig. 1 is an elevational view in section of the endothermic gas generator with a diagrammatic showing of the piping and furnace fed by the generator.

Referring to Fig. 1 of the drawings, the endothermic generator 11 is shown in section. The generator contains a large cylindrical retort 12 which is fabricated of a heat-resistant metal such as one of the well-known nickel chromium alloys. The retort 12 is provided with upper and lower closure members 13 and 14 respectively which are secured as by welding to the cylindrical wall of retort 12. The retort 12 is mounted in the generator 11 in such a way that it may be heated to extremely high temperatures, i. e., between 1700° and 2000° F. The retort is filled with granular catalyst material 15 which may be nickel oxide or any other suitable catalyst material.

The retort 12 is supported in a box-like sheet metal container 16. The sheet metal container 16 is made up of four rectangularly shaped and vertically positioned side walls 17 which are welded together to form a box-like structure. The lower edges of the wall 17 are assembled in abutting relation to bottom member 18. The entire generator is supported by a plurality of angle iron legs 19 which are assembled to the sheet metal container 16 by means of bolts or welding.

Immediately adjacent the side walls 17 of the container 16, there is provided a layer of block insulating material which reduces the heat transfer from the center of the generator to the side walls 17. Spaced from the sides of the generator 11, there is provided a combustion chamber 21 which is of generally rectangular cross section with the retort 12 located in the center thereof. The outer wall of the combustion chamber 21 is formed by a layer of fire resistant brick 22 which is positioned in abutting relation to the insulating material 20.

To heat the retort 12 and its contents to a temperature for efficient reaction of the mixture, there are four gas burners 23 which protrude into the lower end of the combustion chamber 21. The bottom plate 18 of the container 16 is provided with four openings at the corners of the combustion chamber 21 which are adapted to receive the burners 23. The burners 23 are conventional, natural gas burners which are well known in the furnace art. The air and gas supply pipes for these burners are indicated by numerals 24 and 25 respectively. The upper end of combustion chamber 21 has an unobstructed opening 26 through which the combusted gases are discharged.

The bottom end of the retort 12 is provided with an inlet conduit 27, the upper end of which extends into the retort through an opening in the lower closure member 14. The portion of the inlet conduit 27 which extends into retort 12 has a plurality of holes 28 formed therein to permit diffusion of the inlet gas mixture throughout the catalyst bed 15. The inlet conduit 27 terminates in a cap 29 which acts as a closure for the inwardly extending end of the conduit so that the gas mixture passes from the conduit 27 through the holes 28.

An outlet conduit 30 extends through an opening in the upper closure member 13 and communicates with the upper end of retort 12. The outlet conduit 30 is connected by means of suitable piping 31 to the interior of a heat treating furnace 32 for which the gas atmosphere is to be provided.

To produce the desired atmosphere of inert gases, the endothermic generator 11 must be supplied with a suitable mixture of air and a hydrocarbon gas such as methane mixed to a fairly exact ratio. To effect this precise ratio control, the gas line 33 is provided with an orifice 34 and the air line 35 is provided with an orifice 36. These orifices 34 and 36 comprise plates with openings machined therein and clamped between adjacent flange members 37 as shown in Fig. 1. The selected orifice openings are of such relative size that with a predetermined pressure in conduits 33 and 35, a selected air-fuel ratio will be obtained. In the case of methane gas being used as a fuel, this air fuel ratio would be 2.38. Methane gas is supplied to the conduit 33 by means of a constant pressure source.

Figure 2:
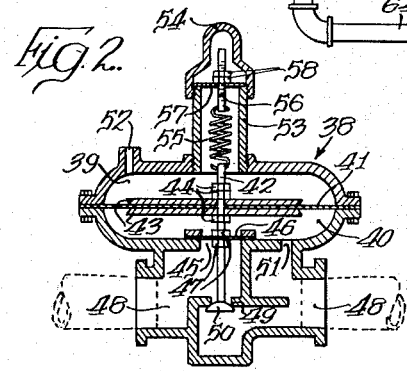
Fig. 2 is an elevational view in section of a pressure regulator employed in the control system of the present invention.

Upstream of the air orifice 36, the conduit 35 is provided with a differential pressure regulator 38. Fig. 2 is a sectional view of the differential pressure regulator 38. The regulator valve 38 is formed with an upper control chamber 39 and a lower control chamber 40. These chambers 39 and 40 are separated by a flexible diaphragm 41. The periphery of diaphragm 41 is clamped between the upper and lower housing portions of regulator 38. Valve actuating stem 42 is secured to the diaphragm member 41 by means of a pair of spaced plates 43 and nuts 44 which are threadedly received on the valve actuating stem 42. The nuts 44 are tightened to clamp diaphragm 41 between plates 43. The lower control chamber 40 has formed in its lower side an opening 45 through which the valve stem 42 extends. A compensating or lower diaphragm 46, the periphery of which is secured to the edge of hole 45, is clamped at its center to the valve stem 42 by means of spaced washers and nuts 47 which are threadedly received on the valve stem 42.

The flow passage 48 extending through the lower portion of regulator 38 is S-shaped having at its mid-point a reduced opening 49 which forms a valve seat. The seat 49 is vertically spaced below said lower diaphragm and axially aligned with said valve stem 42. The valve stem 42 extends downwardly into the flow passage 48 and through the valve seat 49. The valve stem 42 has fixed to its lowermost portion a valve closure member 50 which is of conical shape and adapted to cooperate with the valve seat 49 to close the flow passage 48. The downstream portion of the flow passage 48 is provided with an opening 51 which extends from the flow passage into the lower control chamber 40. The upper control chamber 39 is provided with an opening 52 which is adapted to receive a control pressure conduit.

The regulator 38 has an upwardly extending cylindrical housing 53 and cap 54 which contain the valve adjusting means. The upper end of the valve stem 42 contains a hole which is adapted to receive the lower end of the helical compensating spring 55. The upper end of the spring 55 is secured to the lower end of the threaded adjustment member 56. The cylindrical housing member 53 supports at its upper end a washer member 57 which serves as a support for the adjusting member 56. A pair of nuts 58 are threadedly received on the adjusting member 57 so as to position member 56 relative to the support washer 57. It can be readily understood that by adjusting the nuts 58, the position of adjusting member 56 is changed and thereby the force exerted by spring 55 on the valve stem member 42 is changed.

Referring again to Fig. 1, it can be seen that the pressure regulator 38 is located upstream of the orifice 36 and downstream of a suitable source of air pressure 59 such as a centrifugal fan. The centrifugal fan 59 is connected to regulator 38 by means of suitable piping 60. The upper control chamber 39 of the pressure regulator 38 is connected to the gas conduit 33 through a control pressure line 61. Downstream of the orifices 34 and 36, suitable piping 62 is provided to connect the air and gas conduits 33 and 35 to a T-member 63 where the air and gas are mixed. The air-fuel mixture discharged from the T-member 63 is conveyed by suitable piping 64 to the input conduit member 27 of the generator retort 12.

To effect the control function contemplated in the present invention, the pressure regulator 38 must be modified and adjusted to change the zero setting and the rate of control. To accomplish this modification, the compensating spring 55 is removed from the regulator and shortened. Upon replacement of the spring 55 in the valve, the adjusting nuts 58 are repositioned. The closure member 50 is spaced from the seat 49 when there is zero pressure exerted in the upper control chamber 39. The calibration of valve 38 is effected so that the pressures in conduits 33 and 35 will be the same only when a selected rate of flow is achieved through the system, the selected rate of flow being that flow obtained when there is no obstruction present in the catalyst bed. Thus, when carbon deposits form in the catalyst bed, the rate of gas flow falls as the over-all rate of flow falls; and the air-fuel ratio as controlled by the pressure regulator 38 is increased by virtue of the increased spring rate which has been introduced into the regulator.

The analysis of the operation of regulator 38 may be further clarified by a consideration of the pressures throughout the system. As was previously stated, the inlet gas pressure in conduit 33 is constant. The other pressures existing throughout the system will be subject to change as the degree of obstruction in the catalyst bed 15 changes. As an obstruction builds up in the catalyst bed through the depositing of carbon, the pressure difference existing between the T-member 63 and the retort outlet conduit 30 will increase. This increased difference will be caused largely by an increase in the absolute pressure of the mixture at T-member 63. The rise in pressure at T-member 63 will accordingly be accompanied by a rise in pressure in the air conduit 35 upstream of orifice 36.

The increase in pressure in conduit 35 between the orifice 36 and the regulator 38 will tend to close the pressure regulator 38 since the lower control chamber 40 of the pressure regulator is subject to the downstream pressure in conduit 35. Inasmuch as regulator 38 has been calibrated to control to the gas pressure in conduit 33 only under the conditions of unobstructed flow, the amount of closing of the valve member 50 by this change in downstream pressure will not be enough to make the pressure in conduit 35 equal to the pressure to conduit 33. This result is obvious when it is remembered that the compensating spring 55 has been made "stiffer" so that a pressure change in the lower control chamber 40 will not close the valve as much as it would have in an unmodified pressure regulator. The resultant rise in pressure in conduit 35 occurring when an obstruction is present in the catalyst bed, though not as large as the initial increase, will increase the air-fuel ratio and tend to eliminate the obstruction.

Figure 3:
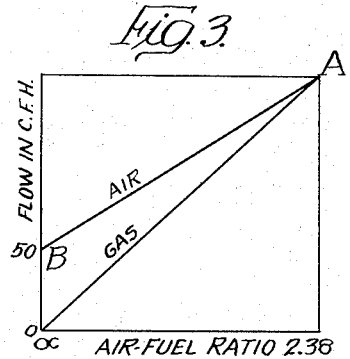
Fig. 3 is a graph of the generator air and fuel flow plotted against the air-fuel ratio.

Referring to Fig. 3, the relationship between the air and fuel flow and the air-fuel ratio is shown graphically. Point A on the drawing represents the optimum condition at which all the input air and gas is completely reacted and where there is no carbon deposit present in the catalyst bed to impede the normal gas flow. The air-fuel ratio for this condition is shown as 2.38. The flow in cubic feet per hour for the air and fuel at point A would be shown on separate scales since the quantity of air flow would be 2.38 times as much as the quantity of gas flow. The slope of the air flow line from point A to point B is less than the slope of the fuel flow line which terminates at zero. This difference in slope arises from the change in spring rate of the compensating spring 55. Since the spring 55 was shortened and the adjusting member 56 moved downwardly to obtain equal pressures at the flow rate A, a reduction of the fuel pressure to zero does not create a condition where the closure member 50 is seated. Thus, considering Fig. 3, it can be seen that with a fuel flow of zero there would still be substantial air flow, i. e., 50 C. F. H. in one selected embodiment, and as a result an infinite air-fuel ratio.

Figure 4:
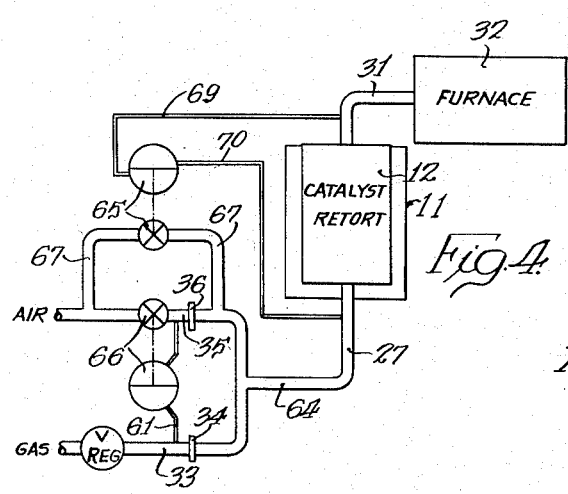
Fig. 4 is a schematic drawing of an alternative embodiment of the invention.

Referring to Fig. 4 of the drawings, there is shown a schematic representation of an alternative embodiment of the invention. The gas generator 11 shown in Fig. 4 is intended to be of similar construction to the one described in connection with Fig. 1. Suitable piping 31 is provided to connect the gas generator to a utilization means such as furnace 32. This embodiment of the invention employs a pair of pressure regulators 65 and 66 similar to the one shown in Fig. 2. The pressure regulators 65 and 66 are conventional differential pressure regulators which have not had any modification effected on the compensating spring 55.

The fuel and air conduits 33 and 35 of Fig. 4 are provided with orifices 34 and 36 respectively which are of similar design and mounting to those described in connection with the embodiment of Fig. 1. The pressure regulator 66 is provided with a control pressure conduit 60 by means of which the pressure in the fuel line conduit 33 is transmitted to the upper control chamber of pressure regulator 66. The lower control chamber of pressure regulator 66 is connected through an orifice to the downstream conduit 35. The pressure regulator 66 and the orifice 36 are by-passed by a second air line 67 which contains the second pressure regulator 65.

The differential pressure regulator 65 has an upper and lower control chamber similar to the pressure regulator 38 previously described but the lower control chamber is not connected to the downstream side of the line in which the regulator is placed. Thus, the valve 65 would be similar to the one depicted in Fig. 2 except that the lower control chamber opening 51 would be sealed and an additional opening would be provided in that chamber to which a suitable pressure control line could be connected. Referring again to Fig. 4, the lower control chamber of the differential regulator 65 is connected by means of conduit 69 to the outlet conduit 31 of the gas generator 11. The upper control chamber of the differential pressure regulator 65 is connected by means of conduit 70 to the inlet conduit 27 of the gas chamber 11.

In operation the orifices 34 and 36 and the pressure regulator 66 of Fig. 4 tend to maintain a substantially constant air-fuel ratio of 2.38 regardless of the rate of flow through the retort 12. The pressure regulator 65 in the air by-pass line 67 is adjusted for zero rate of flow when the pressure drop across the gas generator 11 is such as is present when the flow is unobstructed by carbon deposits. When the catalyst bed becomes obstructed by carbon deposits the flow through the retort 12 is reduced and accordingly the pressure differential across the generator is increased. This increase in differential pressure, caused primarily through the rise in pressure in inlet conduit 27 of the generator, causes the pressure regulator 65 to open and allow air to pass through the by-pass line 67. This increase in the volume of air tends to correct the condition whereby carbon was deposited in the catalyst bed. In this manner, the balance of the components in the generator for complete reaction is maintained.

Thus, utilizing either the embodiment of Fig. 1 or Fig. 4, the reaction oscillates between two conditions of slight unbalance. First a small amount of excess fuel causes a carbon deposit in the catalyst bed, then by an automatic increase in the air-fuel ratio the excess air present tends to consume the carbon and reduce the deposit. In actual practice it has been found that the degree of unbalance resulting when conventional regulators are employed is very negligible.

It should be understood that the present invention contemplates the use of any conventional pressure measuring and controlling means to utilize the change in flow or pressure arising from impurity depositions in the catalyst to control the air-fuel ratio of the input mixture. While there have been shown and described particular embodiments of the present invention, it will be apparent to those skilled in the art that various modifications may be made without departing from the invention in its broader aspects and it is, therefore, aimed in the appended claims to cover all such changes and modifications as fall within the true spirit and scope of the present invention.

What is claimed as new and desired to be secured by Letters Patent of the United States is:

1. An endothermic gas generator having a retort containing catalyst material, a pair of conduits connected to said retort to deliver a mixture of air and gas to said retort, metering orifices in said air and said fuel conduits, the openings in said orifices in said air and fuel conduits being of such size as to maintain a predetermined air fuel ratio at a selected rate of flow of said mixture, a differential pressure regulator connected in said air conduit on the up-stream side of the air conduit metering orifice, means connecting said differential pressure regulator to respond to the difference in pressures between the air in said air conduit and the fuel in said fuel conduit immediately up-stream of said orifices, and said differential pressure regulator being constructed to continuously increase said air fuel ratio in proportion to the flow rate of said mixture as the flow decreases below said selected rate of flow as a result of solids depositing in said catalyst material from an excess of fuel in said mixture.

2. A gas generator of the type described in claim 1 wherein said pressure regulator is of the type having an adjustable compensating spring, said spring being shortened so as to reduce its normal spring rate and said spring being adjusted so that said regulator is partially opened under conditions of zero fuel control pressure.

References Cited in the file of this patent

UNITED STATES PATENTS

| | | |
|---|---|---|
| 2,473,525 | Hoop | June 21, 1949 |
| 2,473,527 | Hoop | June 21, 1949 |
| 2,478,707 | Purvin | Aug. 9, 1949 |
| 2,546,013 | Peck et al. | Mar. 20, 1951 |
| 2,550,126 | Snow | Apr. 24, 1951 |